United States Patent
Chung et al.

(10) Patent No.: US 8,565,620 B2
(45) Date of Patent: Oct. 22, 2013

(54) APPARATUS FOR RECEIVING OPTICAL SIGNAL AND METHOD OF CONTROLLING PHASE OFFSET FOR DIFFERENTIAL QUADRATURE PHASE SHIFT KEYING

(75) Inventors: Hwan-Seok Chung, Daejeon-si (KR); Sun-Hyok Chang, Daejeon-si (KR); Jyung-Chan Lee, Daejeon-si (KR); Kwang-Joon Kim, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 230 days.

(21) Appl. No.: 12/912,870

(22) Filed: Oct. 27, 2010

(65) Prior Publication Data

US 2012/0020676 A1   Jan. 26, 2012

(30) Foreign Application Priority Data

Jul. 21, 2010   (KR) ........................ 10-2010-0070530

(51) Int. Cl.
    *H04B 10/06*   (2006.01)
(52) U.S. Cl.
    USPC ............................ 398/202; 398/204; 398/205
(58) Field of Classification Search
    USPC .................................................. 398/202–214
    See application file for complete search history.

(56) References Cited

U.S. PATENT DOCUMENTS

| | | | |
|---|---|---|---|
| 2005/0088659 A1* | 4/2005 | Schlenk et al. | 356/477 |
| 2006/0072927 A1 | 4/2006 | Kim et al. | |
| 2007/0047954 A1* | 3/2007 | Mamyshev | 398/33 |
| 2007/0047964 A1* | 3/2007 | Ooi et al. | 398/147 |
| 2007/0230625 A1 | 10/2007 | Hironishi et al. | |
| 2008/0019463 A1* | 1/2008 | Ikeuchi et al. | 375/331 |
| 2008/0238515 A1 | 10/2008 | Kim et al. | |
| 2009/0214226 A1 | 8/2009 | Mizuguchi et al. | |
| 2012/0230677 A1* | 9/2012 | Li | 398/25 |

FOREIGN PATENT DOCUMENTS

| | | | |
|---|---|---|---|
| JP | 2007-060583 A | 3/2007 | |
| KR | 10-2006-0030671 A | 4/2006 | |
| KR | 10-0849213 B1 | 7/2008 | |

\* cited by examiner

*Primary Examiner* — Dzung Tran
(74) *Attorney, Agent, or Firm* — Rabin & Berdo, P.C.

(57) ABSTRACT

An apparatus for receiving optical signals in DQPSK and method of controlling a phase offset in receiving optical signals for DQPSK is provided. An original optical signal modulated in DQPSK is received. The original optical signal is delayed by one bit to make a delay optical signal such that an interference on the original optical signal and the delay optical signal is performed. A control signal is generated by use of an interference result between the original optical signal and the delay optical signal. A phase offset for the interference between the original optical signal and the delay optical signal is controlled by use of the generated control signal. In receiving optical signals, the phase offset between the delay optical signal and the original optical signal is precisely controlled, thereby optimizing the transfer characteristics of an optical delay interferometer.

16 Claims, 9 Drawing Sheets

APPARATUS FOR RECEIVING OPTICAL SIGNAL AND METHOD OF CONTROLLING PHASE OFFSET FOR DIFFERENTIAL QUADRATURE PHASE SHIFT KEYING

CROSS-REFERENCE TO RELATED APPLICATION

This application claims the benefit under 35 U.S.C. §119(a) of Korean Patent Application No. 10-2010-0070530, filed on Jul. 21, 2010, the disclosure of which is incorporated by reference in its entirety for all purposes.

BACKGROUND

1. Field

The following description relates to an apparatus for receiving optical signals, and more particularly, to an apparatus for receiving optical signals and a method of controlling a phase offset for differential quadrature phase shift keying.

2. Description of the Related Art

Differential quadrature phase shift keying (DPQSK) is a digital modulation scheme that conveys data by changing the phase of an optical signal and has an advantage of ensuring a secure long distance transmission over on-off keying in which data is conveyed by changing the intensity of an optical signal.

In order to receive a phase-modulated optical signal, a photodetector of a receiving end needs to be provided at a front end thereof with an optical delay interferometer that converts the phase-modulated signal into an intensity-modulated optical signal.

Transfer characteristics of an optical delay interferometer are dependent upon input wavelength. Accordingly, a phase difference between a delay signal and a non-delay signal needs to be appropriately set such that the phase-modulated signal is converted into the intensity-modulated signal.

SUMMARY

In one general aspect, there is provided a method of controlling a phase offset in receiving optical signals for differential quadrature phase shift keying (DQPSK). The method is as follows. An original optical signal is delayed by one bit to make a delay optical signal and to perform an interference on the original optical signal and the delay optical signal. A control signal is generated by use of an interference result between the original optical signal and the delay optical signal. A phase offset for the interference between the original optical signal and the delay optical signal is controlled by use of the generated control signal.

In the performing of the interference between the original optical signal and the delay optical signal, a constructive interference signal is output by performing a constructive interference on an original optical signal and a delay optical signal, and a destructive interference signal is output by performing a destructive interference on an original optical signal and a delay optical signal.

In another general aspect, there is provided an apparatus of receiving optical signals for differential quadrature phase shift keying (DQPSK). The apparatus includes a delay interference unit and a phase offset control unit. The delay interference unit is configured to delay an original optical signal modulated in DQPSK by one bit to make a delay optical signal and perform an interference on the original optical signal and the delay optical signal. The phase offset control unit is configured to generate a control signal by use of an interference result between the original optical signal and the delay optical signal, and control a phase offset for the interference between the original optical signal and the delay optical signal by use of the generated control signal.

The delay interference unit includes a constructive interference unit and a destructive interference unit. The constructive interference unit delays an original optical signal to make a delay optical signal by one bit and performs a constructive interference between the original optical signal and the delay optical signal. The destructive interference unit delays an original optical signal to make a delay optical signal by one bit and performs a destructive interference between the original optical signal and the delay optical signal.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
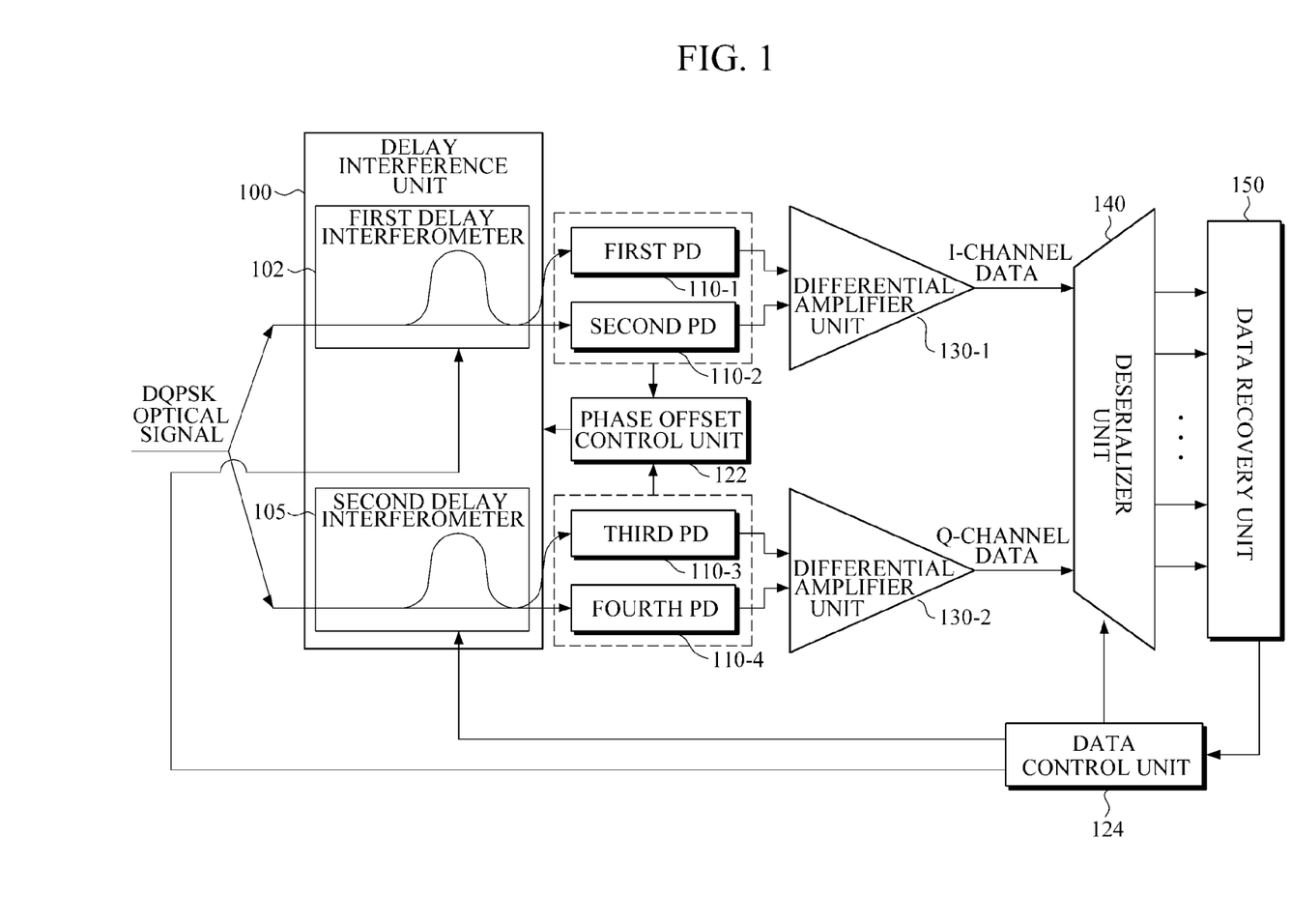
FIG. 1 is a block diagram illustrating an example of an optical receiving apparatus.

FIG. 1 is a block diagram illustrating an example of an optical receiving apparatus.

As shown in FIG. 1, an optical receiving apparatus includes a delay interference unit 100, a photo-detector unit 110, a control unit 120, differential amplifier units 130-1 and 130-2, a deserializer unit 140 and a data recovery unit 150.

The delay interference unit 100 performs an interference between an original optical signal and a delay optical signal obtained by delaying the original optical signal by one bit.

The delay interference unit 100 performs two delay interferences to cause phase shifts of +π/4 and −π/4.

For example, the input optical signal is input into a first delay interferometer 102 and a second delay interferometer 105 of the delay interference unit 100. The first delay interferometer 102 and the second delay interferometer 105 are configured to allow the original optical signal and the delay signal to make a phase difference of π/4 and a phase difference of −π/4. According to one example, each of the delay interferometers 102 and 105 has two ports to output a result of an interference between the original optical signal and the delay optical signal. One of the two ports is used to output a result of a constructive interference and the other is used to output a result of a destructive interference.

The photo-detector unit 110 includes a plurality of photo-diodes 110-1, 110-2, 110-3 and 110-4, and converts an optical signal output from the first delay interferometer 102 and the second delay interferometer 105 into an electrical signal.

The differential amplifier units 130-1 and 130-2 perform a differential amplification on the electrical signal output from the photo-detector unit 110 and output the result of the differential amplification. For example, the photo-detector unit 110 may include four photodiodes including two photodiodes 110-1 and 110-2 to receive the original optical signal and the delay signal output from the first delay interferometer 102 and two photodiodes 110-3 and 110-4 to receive the original optical signal and the delay optical signal output from the second delay interferometer 105. However, the configuration of the photo-detector unit is not limited thereto.

The electrical signals output from the differential amplifier units 130-1 and 130-2 correspond to I-channel data and Q-channel data, respectively, for differential quadrature phase shift keying (DQPSK). A high speed signal amplified in the differential amplifier units 130-1 and 130-2 is input to the deserializer unit 140 to demultiplex the high speed signal into a low speed signal.

The deserializer unit 140 may swap the two input channel data or invert at least one of the two input channel data according to the control of a data control unit 124 to be described later such that effective data is recovered by a framer.

The low speed parallel data output from the deserializer unit 140 is input to the data recovery unit 150. According to one example, the data recovery unit 150 may be implemented using a framer. The data recovery unit 150 may recover effective data by receiving a preset code that is sent from a sending apparatus.

According to this example, the optical receiving apparatus for DQPSK performs control such that the delay interferometers produce phase offsets of +π/4 and −π/4. The transfer characteristics of the delay interferometer according to the phase offset vary depending on the wavelength of the optical signal and the operation temperature, and thus the phase offset of the delay interferometer needs to be maintained at the optimum level.

However, it is impossible to recognize the absolute phase offset value actually made in the delay interferometers. If the phase offset values significantly deviate from +π/4 and −π/4 to a predetermined extent, the phase offset setting values of the two delay interferometers may be changed. In addition, when the phase of data is inverted in an RF amplifier and an optical-electric/electric-optical converter unit, the recovered I-channel data and Q-channel data may be subjected to swapping or inversion. According to the present invention, an operation point of the delay interferometers is optimized and effective I-channel data and effective Q-channel data are recovered.

The phase offset control unit 122 generates a control signal by use of an interference result obtained from the first delay interferometer 102 and the second delay interferometer 105, and controls a phase offset of the delay interferometers 102 and 105 by use of the generated control signal. The control of the phase offset by the phase offset control unit 122 will be described in detail later.

The data control unit 124 monitors the effective data recovered by the data recovery unit 150 to monitor whether effective channel data has been recovered and controls swapping or inversion of the serial data of the deserializer unit 140 such that the effective channel data is recovered.

In addition, the data control unit 124 controls a phase shift of the delay interferometers 102 and 105 to recover the effective channel data by performing a phase change based on the result of the interference in the delay interferometers 102 and 105 and the control signal.

As described above, if the phase offset setting values of the delay interferometers 102 and 105 are changed or the phase of the data is inverted in an RF amplifier and an optical-electric/electric-optical converter unit, the recovered I-channel data and Q-channel data may be subjected to swapping or inversion, so that it is difficult to recover precise data sent from the sending apparatus.

Accordingly, the data control unit 124 monitors the amplitudes of signals received from the two delay interferometers and the control signal generated from the phase offset control unit 122 such that two different electrical signals are recovered. The data control unit 124 performs control to recover effective data by performing swapping or inversion on two electrical signals such that a preset code is recovered in the data recovery unit 150.

According to one example, if the amplitude of monitoring signal is small or an additional phase offset adjustment is needed, the data control unit 124 may perform additional control on the delay interferometers 102 and 105 to minimize the number of data errors by use of an error correction code decoder embedded in the data recovery unit 150.

It is impossible for the data control unit 125 to recognize the absolute phase offset value actually made in the delay interferometers 102 and 105. Accordingly, the data control unit 124 performs control to recover effective channel data by use of the amplitudes of the control signal generated by the phase offset control unit 122, the I-channel signal output from the first delay interferometer 102 and the Q-channel signal output from the second delay interferometer 105.

Hereinafter, the phase offset control of the phase offset control unit and the data determination of the data control unit will be described in detail with reference to FIGS. 2 to 5.

Figure 2:
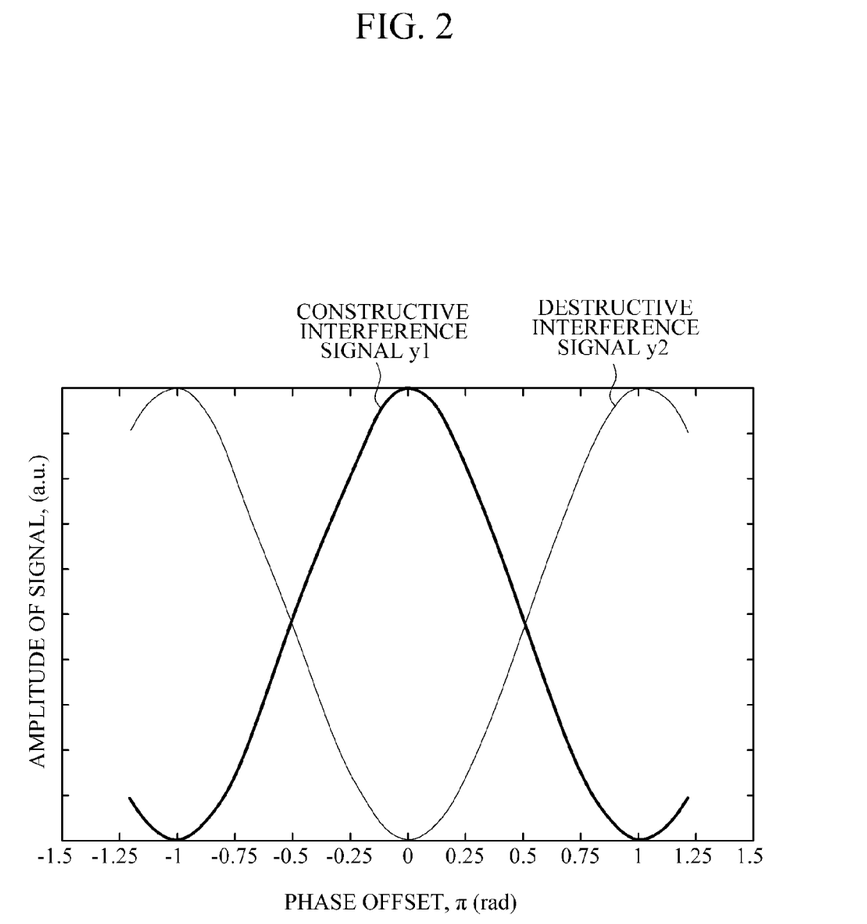
FIG. 2 is a graph illustrating amplitudes of output signals of constructive/destructive ports according to a phase offset value.

FIG. 2 is a graph illustrating amplitudes of output signals of constructive/destructive ports according to a phase offset value.

As shown in FIG. 2, when the phase offset value is 0, one of the two ports of the delay interferometer has a maximum output and the other has a minimum. On the other hand, when the phase offset value is π or −π, the two ports have output results opposite to those of the two ports at the phase offset value of 0. In order to receive a DQPSK signal, a phase offset of +π/4 or −π/4 is required. Hereinafter, a method of maintaining the phase offset of +π/4 or −π/4 in the delay interferometer is described.

In FIG. 2, when the magnitude of a constructive interference output signal is y1 and the magnitude of a destructive interference output signal is y2, the signals are converted into electrical signals through a photodetector and input to a control loop. When the phase off value is x, the signal y1 and the signal y2 are provided in the form of cos(x) and −cos(x), respectively. The control loop generates a control signal by use of the two signals y1 and y2. The control signal c1 is defined as in equation 1.

$$c_1 = (y_1 - y_2)^2 \text{ or } (y_2 - y_1)^2 \qquad [\text{Equation 1}]$$

Here, if necessary, the control signal c1 may be amplified to an appropriate value or a DC component may be added to or subtracted from the control signal c1. A control signal c2 is the square of the variation of the control signal c1 according to the phase offset, that is, the square of the derivative of the control signal c1 according to the phase offset value (x).

$$c_2 = \left(\frac{1}{dx}(c_1)\right)^2 \qquad [\text{Equation 2}]$$

Figure 3:
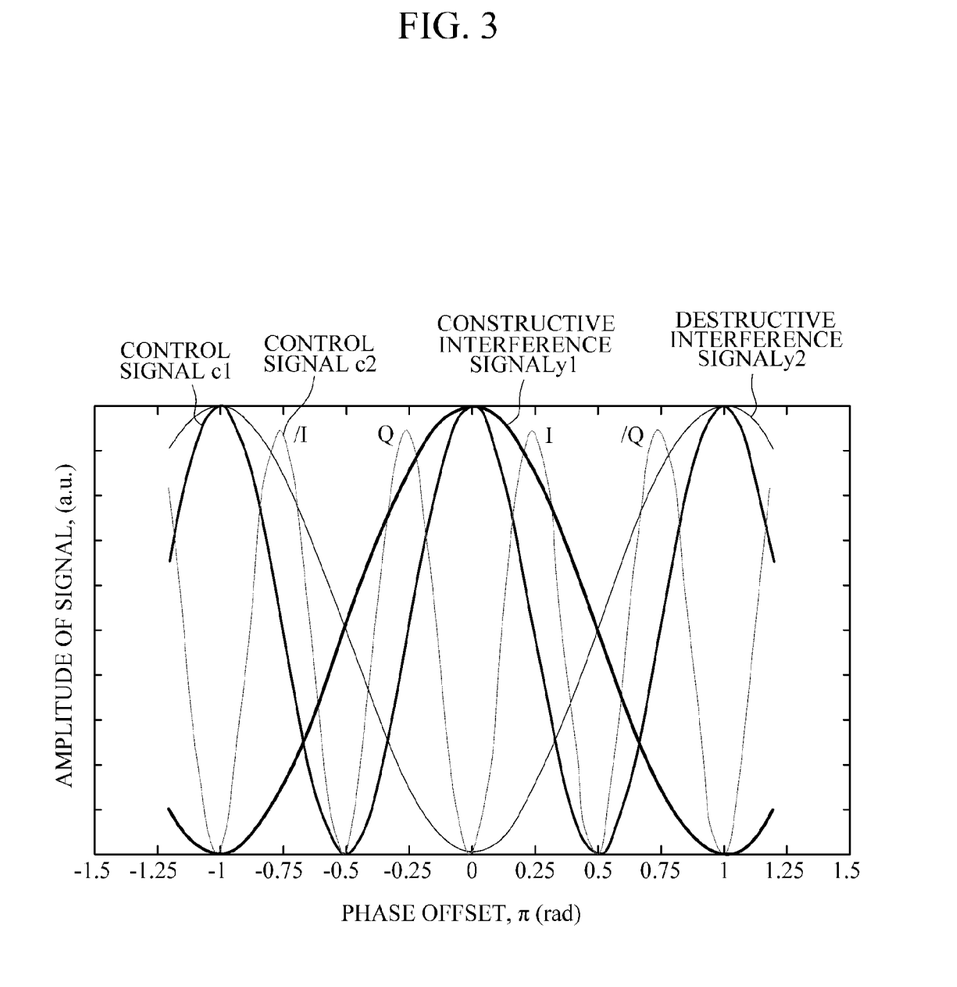
FIG. 3 is a graph illustrating an example of the variation of control signals according to the phase offset value.

FIG. 3 is a graph illustrating an example of the variation of control signals according to the phase offset value.

As shown in FIG. 3, the control signal c2 has a maximum value whenever the phase offset changes by π/2. Accordingly, the I-channel data or the Q-channel data is recovered by adjusting the phase offset such that the control signal has the maximum value. If the control signal c2 is obtained through equation 2, the control loop operates such that the control signal c2 has the minimum value.

That is, the phase offset control unit 122 may maintain the phase offsets at the values of +π/4 and −π/4 in the delay interference unit 100 by allowing the control signal c2 to have the maximum value or the minimum value. Meanwhile, when the control signal c2 has the maximum value, if the phase offset difference between the original optical signal and the delay signal is +π or −π, I and /I that are equal in data but of opposite phase or Q and /Q that are equal in data but of opposite phase are recovered, failing to receive effective data.

Accordingly, as shown in Table 1, the effective data is recovered based on the amplitudes of the monitoring signals y1 and y2 and the slope (variation) of the control signal c1.

| Data | y1 > y2 | Slope (Variation) of c1 |
|------|---------|-------------------------|
| Q    | Yes     | +                       |
| I    | Yes     | −                       |
| /Q   | No      | +                       |
| /I   | No      | −                       |

Table 1 shows criteria for 1 and Q signal determination in the control process in the delay interference unit.

That is, in Table 1, y1>y2 indicates whether a phase inversion has happened to c1, and the slope of c1 at a predetermined timing point indicates whether data at the timing point is I, Q, /I or /Q. That is, the data control unit 124 recognizes an effective data based on the values shown in Table 1 and controls the phase offset to recover the effective data.

According to another example, only y1 may be used in controlling the phase offset or determining the I-channel data and the Q-channel data.

Figure 4:
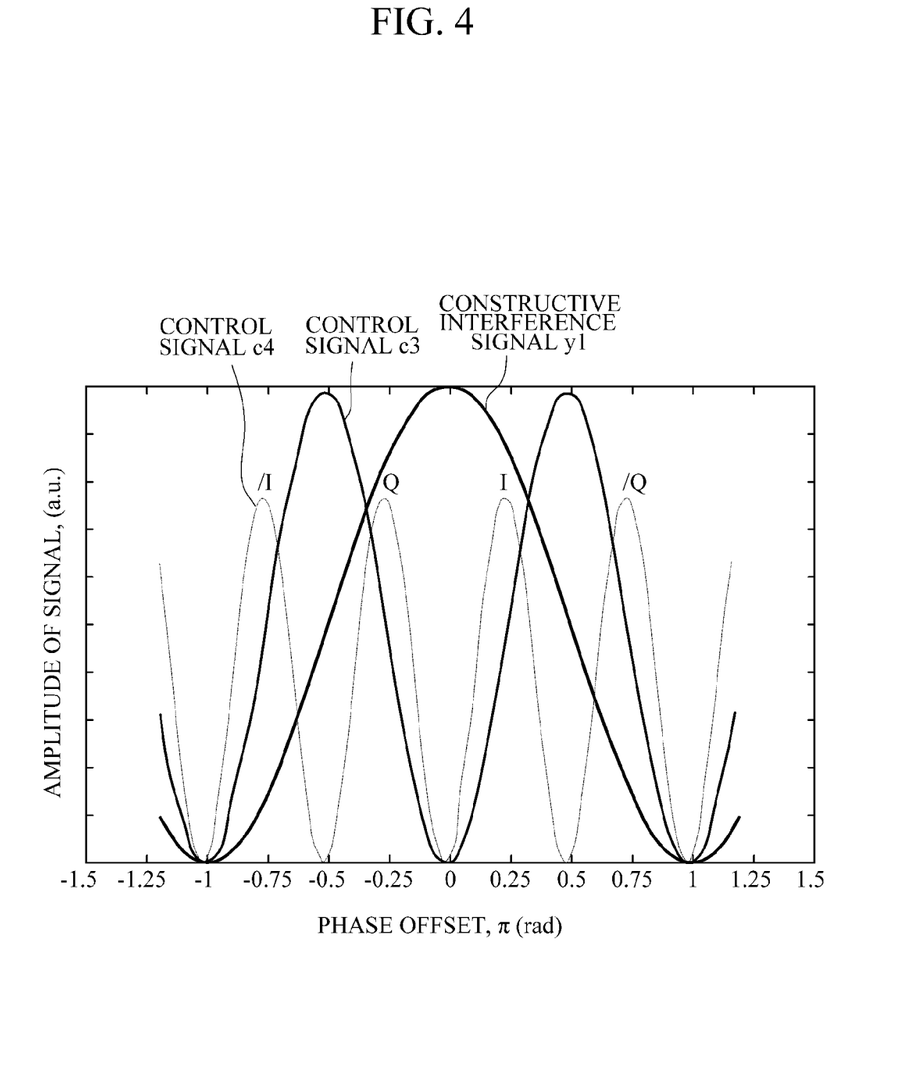
FIG. 4 is a graph illustrating an example of the variation of control signals according to the phase offset value.

FIG. 4 is a graph illustrating an example of the variation of control signals according to the phase offset value.

A control signal c3 is the square of the variation of the constructive interference signal y1 according to the phase offset, that is, the square of the derivative of constructive interference signal y1 according to the phase offset value (x).

$$c_3 = \left(\frac{1}{dx}(y_1)\right)^2 \qquad [\text{Equation 3}]$$

A control signal c4 is the square of the derivative of the control signal c3 according to the phase offset value (x).

$$c_4 = \left(\frac{1}{dx}(c_3)\right)^2 \qquad [\text{Equation 4}]$$

As shown in FIG. 4, the control signal c4 has a maximum value whenever the phase offset changes by π/2. Accordingly, the control loop adjusts the phase offset such that the control signal c4 has the maximum value, thereby maintaining the phase offset of the delay interferometers at +π/4 and −π/4, and recovering effective I-channel data and Q-channel data. It is obvious that the phase offset control may be achieved such that the control signal c4 has the minimum value when the phase of the control signal c4 is inverted. In order to prevent the signal component, which is equal in data but of opposite phase, from being recovered, the division of the I-channel data and the Q-channel data is performed based on the monitoring signal and the slope of the variation of the control signal obtained through table 1.

Table 2 shows an example of criteria for I and Q signal determination.

| Data | Slope (variation) of y1 | Slope (variation) of C3 |
|------|-------------------------|-------------------------|
| I    | +                       | +                       |
| Q    | +                       | −                       |
| /I   | −                       | +                       |
| /Q   | −                       | −                       |

As shown in Table 2, the determination of the I-channel data and the Q-channel data is precisely recognized based on the variation of y1 and the variation of c3.

Figure 5:
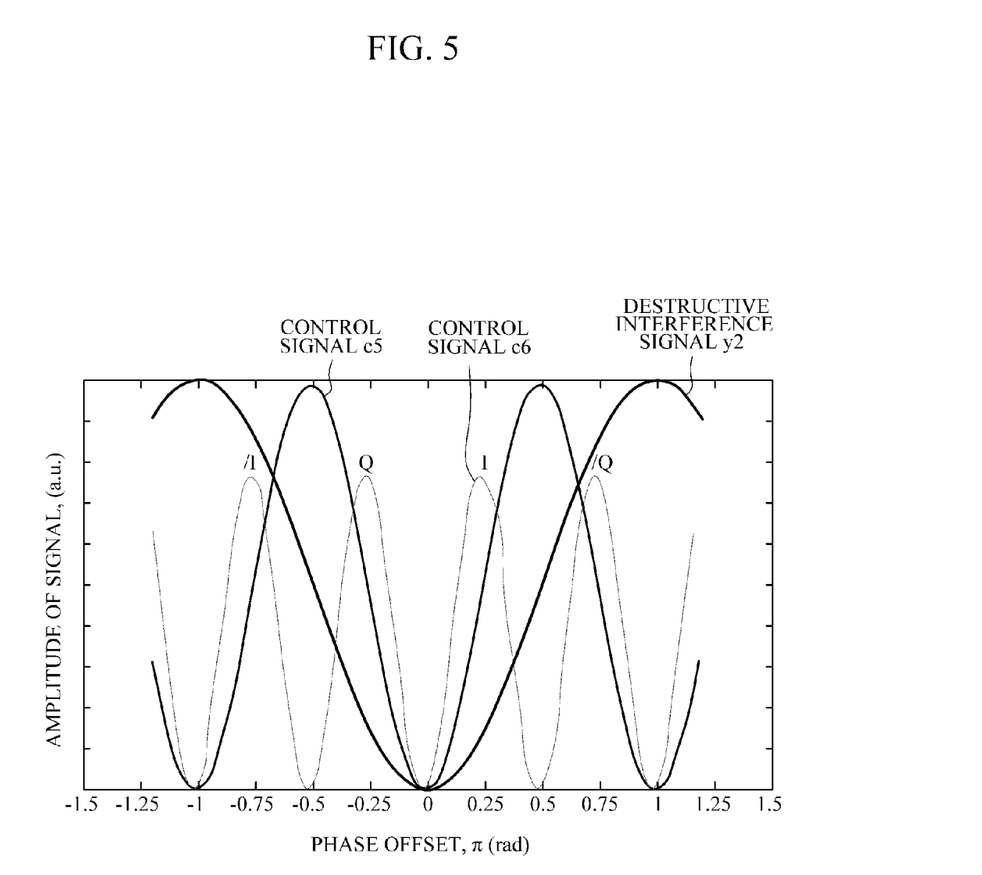
FIG. 5 is a graph illustrating an example of the variation of control signals according to the phase offset value.

According to another example, only y2 may be used in controlling the phase offset or determining the I-channel data and the Q-channel data. In order to control the phase offset of the delay interferometers, only the output signal y2 of the destructive interference port may be used. In this case, control signals c5 and c6 are generated as shown in equation 5.

$$c_5 = \left(\frac{1}{dx}(y_2)\right)^2 \qquad [\text{Equation 5}]$$

$$c_6 = \left(\frac{1}{dx}(c_5)\right)^2$$

FIG. 5 is a graph illustrating an example of the variation of control signals according to the phase offset value.

As show in FIG. 5, I-channel data or Q-channel data is recovered by adjusting the phase offset value such that the control signal c6 has the maximum value.

It is obvious that the phase offset control may be achieved such that the control signal c6 has the minimum value when the phase of the control signal c6 is inverted. In order to prevent the signal component, which is equal in data but of opposite phase, from being recovered, the division of the I-channel data and the Q-channel data is performed based on the monitoring signal and the slope of the variation of the control signal obtained through table 2.

Figure 6:
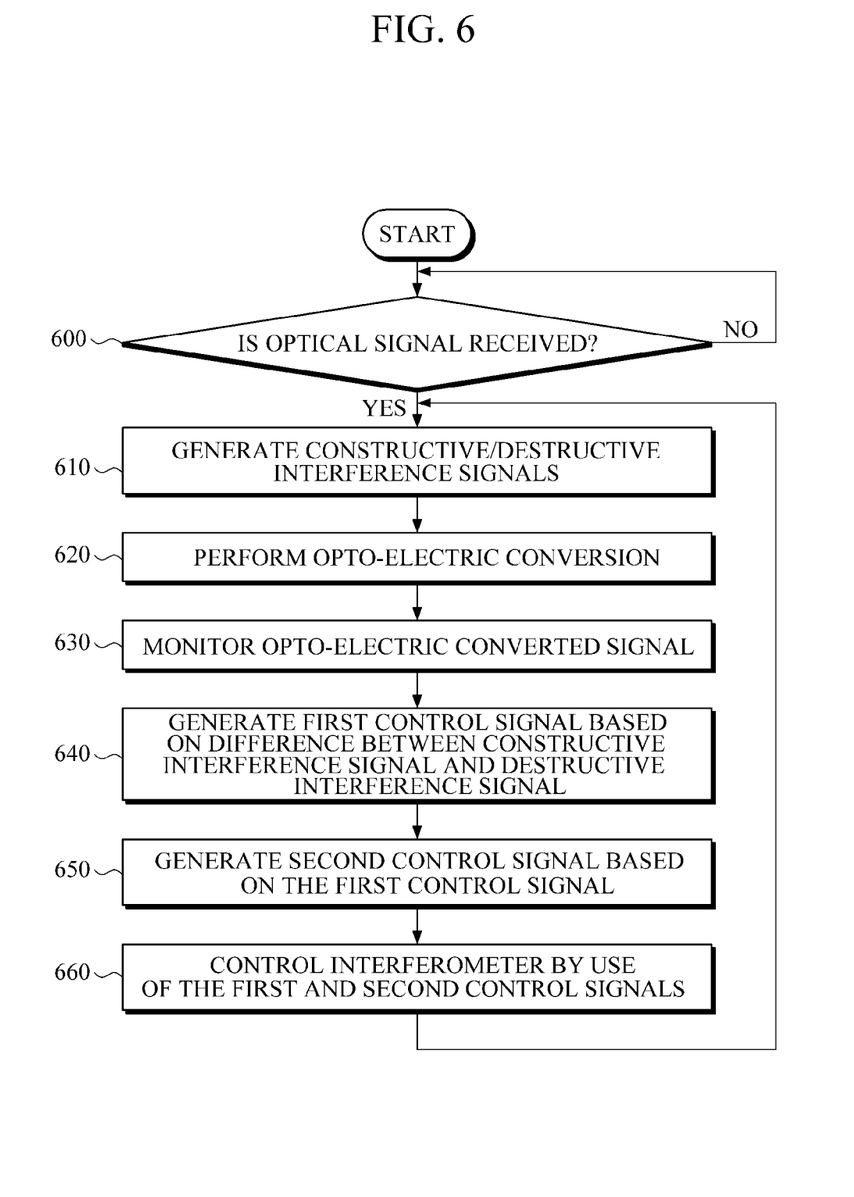
FIG. 6 is a flowchart showing one example of a method of controlling a phase offset.

FIG. 6 is a flowchart showing one example of a method of controlling a phase offset.

First, an optical signal is received (600), and the received optical signal is provided to each of delay interferometers. The delay interferometers may perform interference between an original optical signal and a delay signal obtained by delaying the original optical signal by one bit. In detail, the delay interferometers perform a constructive interference and a destructive interference, respectively, and output a constructive interference signal and a destructive interference signal, respectively (610).

After that, the constructive interference signal and the destructive interference signal are converted into electrical signals (620). The constructive interference signal and the destructive interference signal converted into electrical signals are monitored (630). A control signal for phase offset is generated by use of the monitoring result (640). The phase offset for the interference between signals is controlled by the generated control signal.

Hereinafter, a process of generating the control signal from interference signals and controlling the phase offset will be described in detail.

According to one example, a first control signal $c_1$ is generated based on the difference between the constructive interference signal and the destructive interference signal (640), and a second control signal $c_2$ is generated based on the variation of the first control signal $c_1$ according to the phase offset (650). In this case, by controlling the phase offset such that the second control signal $c_2$ has the maximum value or the minimum value, the phase offset values of the delay interferometers are maintained at $+\pi/4$ and $-\pi/4$ (660).

Figure 7:
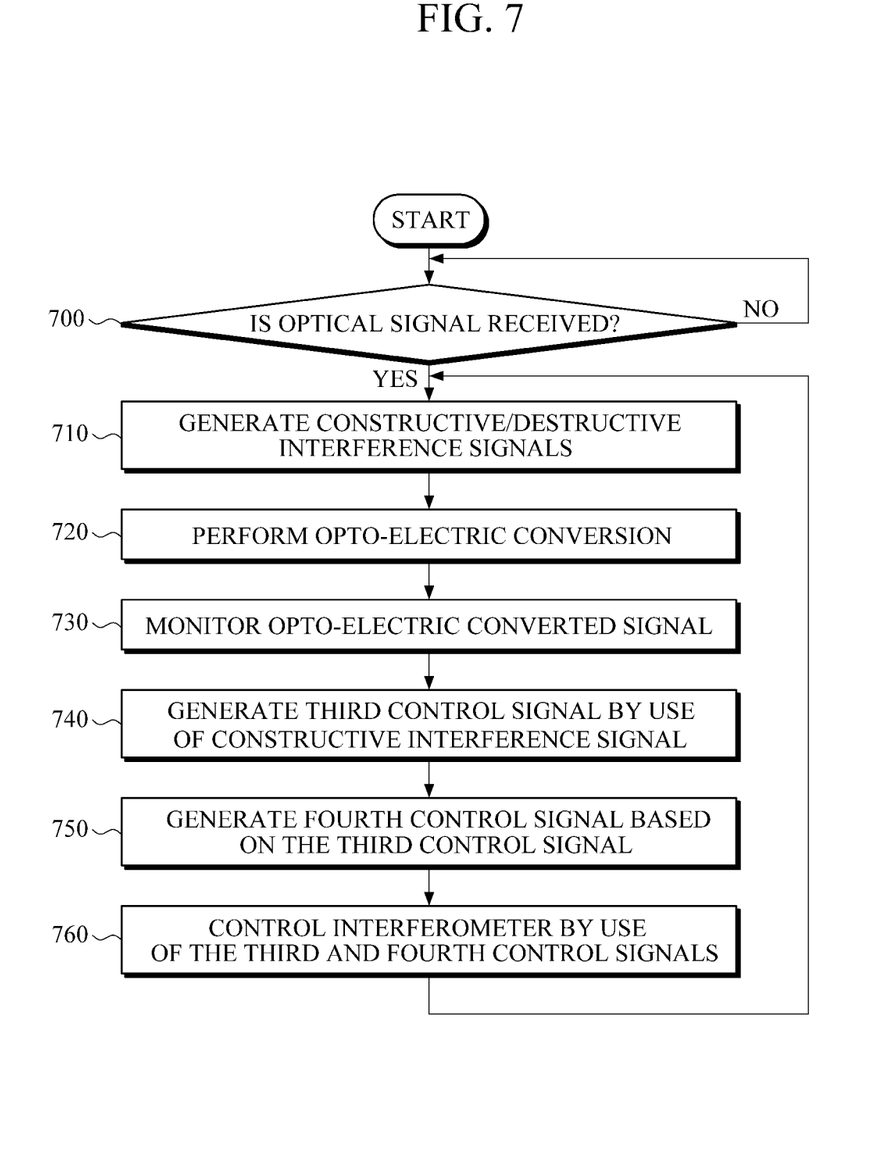
FIG. 7 is a flowchart showing another example of a method of controlling a phase offset.

FIG. 7 is a flowchart showing another example of a method of controlling a phase offset. As shown in FIG. 7, an optical signal is received (700), and the received optical signal is provided to each of delay interferometers. The delay interferometers delay the received optical signals to perform interference between an original optical signal and a delay signal. In detail, the delay interferometers perform a constructive interference and a destructive interference, respectively, and output a constructive interference signal and a destructive interference signal, respectively (710). After that, the constructive interference signal and the destructive interference signal are converted into electrical signals (720), and the constructive interference signal and the destructive interference signal converted into electrical signals are monitored (730). A third control signal $c_3$ is generated based on the variation of the constructive interference signal according to the phase offset (740), and a fourth control signal $c_4$ is generated based on the variation of the third control signal $c_3$ according to the phase offset (750). In this case, preferably, the phase offset is controlled such that the fourth control signal $c_4$ has the maximum value or the minimum value (760).

Figure 8:
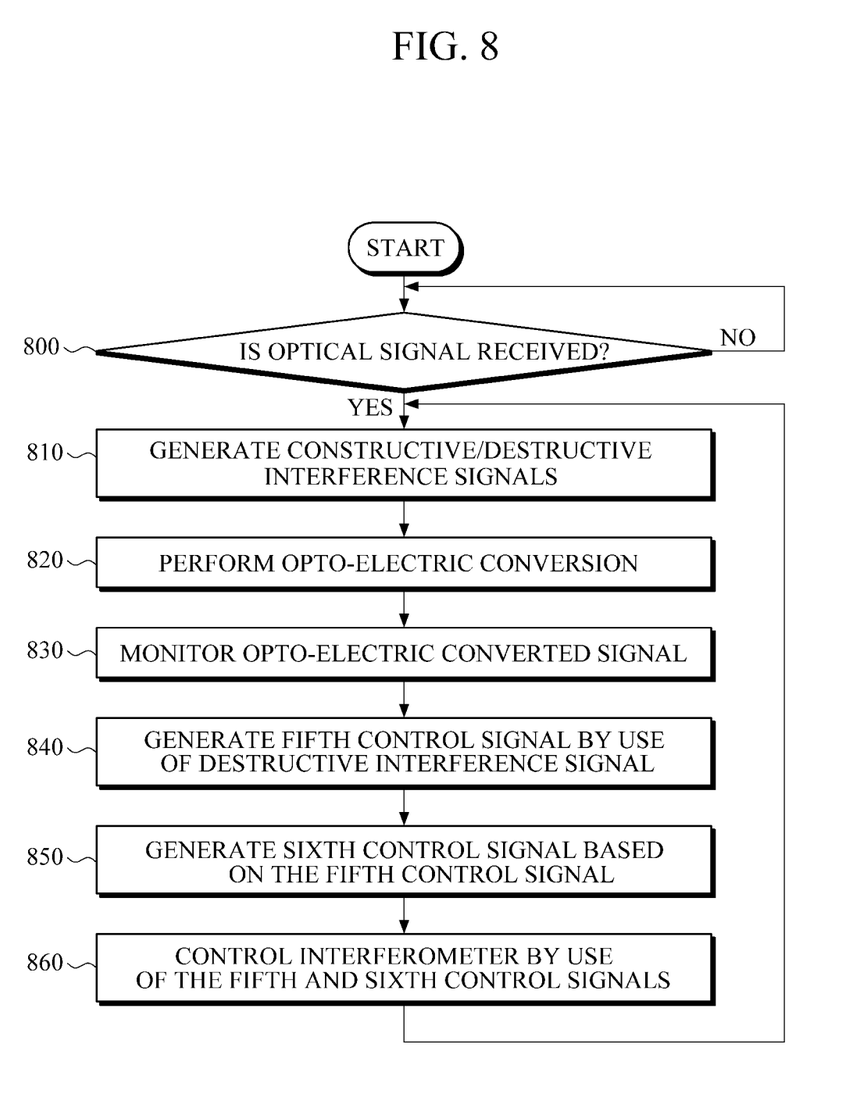
FIG. 8 is a flowchart showing still another example of a method of controlling a phase offset.

FIG. 8 is a flowchart showing still another example of a method of controlling a phase offset. As shown in FIG. 8, an optical signal is received (800), and the received optical signal is provided to each of delay interferometers. The delay interferometers delay the received optical signals to perform interference between an original optical signal and a delay signal. In detail, the delay interferometers perform a constructive interference and a destructive interference, respectively, and output a constructive interference signal and a destructive interference signal, respectively (810). After that, the constructive interference signal and the destructive interference signal are converted into electrical signals (820), and the constructive interference signal and the destructive interference signal converted into electrical signals are monitored (830). A fifth control signal $c_5$ is generated based on the variation of the destructive interference signal according to the phase offset (840), and a sixth control signal $c_6$ is generated based on the variation of the fifth control signal $c_5$ according to the phase offset (850). In this case, the phase offset is controlled to allow the fourth control signal $c_4$ to have the maximum value or the minimum value, thereby maintaining the phase offset values of the delay interferometers at $+\pi/4$ and $-\pi/4$ (860).

Figure 9:
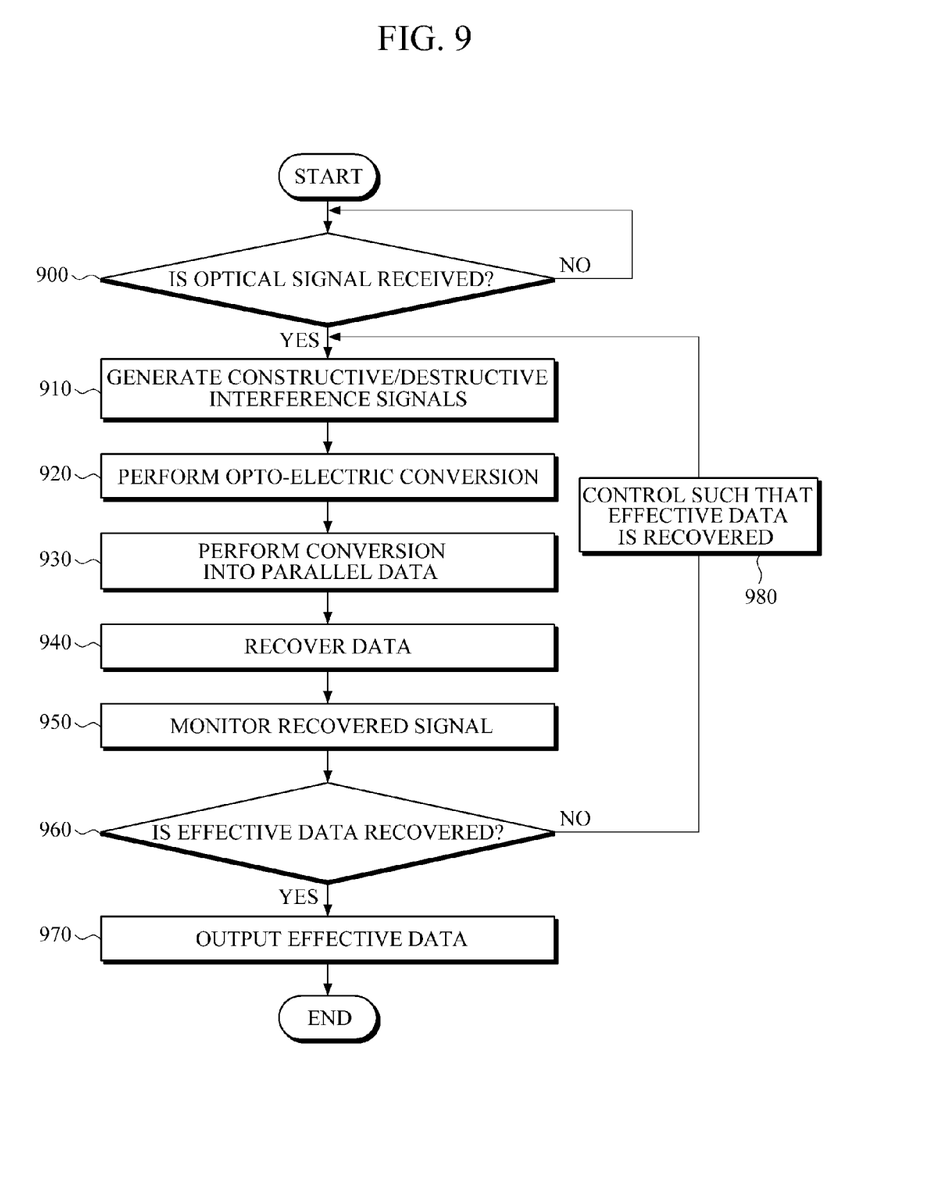
FIG. 9 is a flowchart showing one example of a method of receiving optical signals.

FIG. 9 is a flowchart showing one example of a method of receiving optical signals.

First, an optical signal is received (900), and the received optical signal is provided to each of delay interferometers. The delay interferometers delay the received optical signals to perform interference between an original optical signal and a delay signal. In detail, the delay interferometers perform a constructive interference and a destructive interference, respectively, and output a constructive interference signal and a destructive interference signal, respectively (910).

After that, the constructive interference signal and the destructive interference signal are converted into electrical signals (920), and the electrical signals are subjected to differential amplification. Then, the differential amplified high speed signal is converted into low speed parallel data (930). A framer recovers data (940).

The recovered data is monitored (950) and it is determined whether effective channel data has been recovered (960).

As a result of determination, if it is determined that the effective channel data has been recovered, the effective channel data is output (970). If it is determined that the effective channel data has not been recovered, a deserializer unit performs swapping on two input data or performs inversion on at least one of the two input data such that a preset code sent from a sending apparatus is correctly received and effective data is recovered (980).

In addition, effective channel data may be recovered by varying the delay interferometer.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network-coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a phase offset in receiving optical signals for differential quadrature phase shift keying (DQPSK), the method comprising:

receiving an original optical signal modulated in DQPSK;

delaying the original optical signal by one bit to make a delay optical signal and performing an interference on the original optical signal and the delay optical signal;

generating a control signal by use of an interference result between the original optical signal and the delay optical signal; and controlling a phase offset for the interference between the original optical signal and the delay optical signal by use of the generated control signal;

wherein the generating of the control signal includes determining a variation, according to the phase offset, of a constructive interference signal and a destructive interference signal corresponding to the original optical signal and the delay optical signal.

2. The method of claim 1, wherein the performing of the interference between the original optical signal and the delay optical signal comprises:

outputting a constructive interference signal by performing a constructive interference on an original optical signal and a delay optical signal; and outputting a destructive interference signal by performing a destructive interference on an original optical signal and a delay optical signal.

3. The method of claim 2, wherein in the generating of the control signal, the control signal is generated by use of the constructive interference signal or the destructive interference signal.

4. The method of claim 2, wherein the generating of the control signal comprises:

generating a first control signal based on one of a difference between the constructive interference signal and the destructive interference signal, a variation of the constructive interference signal according to the phase offset and a variation of the destructive interference according to the phase offset; and generating a second control signal based on a variation of the first control signal according to the phase offset.

5. The method of claim 1, wherein in the controlling of the phase offset, the phase offset is adjusted such that generated control signal is a maximum value or a minimum value.

6. An apparatus of receiving optical signals for differential quadrature phase shift keying (DQPSK), comprising:

a delay interference unit configured to delay an original optical signal modulated in DQPSK by one bit to make a delay optical signal and perform an interference on the original optical signal and the delay optical signal; and a phase offset control unit configured to generate a control signal by use of an interference result between the original optical signal and the delay optical signal, and control a phase offset for the interference between the original optical signal and the delay optical signal by use of the generated control signal;

wherein the phase offset control unit is configured to generate the control signal at least in part by determining a variation, according to the phase offset, associated with a constructive interference signal and a destructive interference signal corresponding to the original optical signal and the delay optical signal.

7. The apparatus of claim 6, wherein the delay interference unit outputs a constructive interference result between the original optical signal and the delay optical signal and a destructive interference result between the original optical signal and the delay optical signal.

8. The apparatus of claim 6, further comprising a photo-detector unit to convert an optical signal corresponding to a result of the interference between the original optical signal and the delay optical signal into an electrical signal.

9. The apparatus of claim 8, wherein the phase offset control unit generates a control signal by use of an output signal of the photo-converter unit.

10. The apparatus of claim 8, wherein the photo-detector unit is a photodiode.

11. The apparatus of claim 8, further comprising a differential amplifier unit to perform differential amplification on the output signal of the photo-detector unit.

12. The apparatus of claim 11, further comprising:

a deserializer unit configured to convert serial data output from the differential amplifier unit into parallel data and output the parallel data; and a framer configured to recover effective data from the parallel data output from the deserializer unit.

13. The apparatus of claim 12, further comprising a data control unit configured to monitor whether effective channel data is recovered by monitoring the effective data recovered by the framer and to control swapping or inversion of the serial data of the deserializer unit such that the effective channel data is recovered.

14. The apparatus of claim 13, wherein the data control unit performs control to recover the effective channel data by use of the control signal.

15. The apparatus of claim 13, wherein the data control unit controls a phase shift of the delay interference unit to recover the effective channel data by performing a phase change based on the result of the interference and the control signal.

16. The apparatus of claim 12, wherein the phase offset control unit controls the phase offset of the delay interference unit to produce a minimum number of errors by obtaining an error correction code from the framer.

\* \* \* \* \*